US012433376B2

(12) United States Patent
Fawcett et al.

(10) Patent No.: US 12,433,376 B2
(45) **Date of Patent: *Oct. 7, 2025**

(54) COMBINATION WATCH AND MULTI-CAR KEY

(71) Applicant: Armour Surveillance Security Equipment and Technology Ltd., London (GB)

(72) Inventors: Patrick James Fawcett, London (GB); Richard Dinan, Beaconsfield (GB)

(73) Assignee: ARMOUR SURVEILLANCE SECURITY EQUIPMENT AND TECHNOLOGY LTD., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,364

(22) Filed: Feb. 8, 2023

(65) Prior Publication Data

US 2023/0248124 A1 Aug. 10, 2023

(30) Foreign Application Priority Data

Feb. 8, 2022 (GB) ..................................... 2201604

(51) Int. Cl.

| | |
|---|---|
| ***A44C 5/00*** | (2006.01) |
| ***A44C 5/14*** | (2006.01) |
| ***G07C 9/00*** | (2020.01) |

(52) U.S. Cl.

CPC ............ *A44C 5/0038* (2013.01); *A44C 5/147* (2013.01); *G07C 9/00896* (2013.01); *G07C 2009/00769* (2013.01); *G07C 2009/00968* (2013.01)

(58) Field of Classification Search

CPC ....... A44C 5/0053; A44C 5/14; A44C 5/2071; A44C 5/0007; A44C 5/147;

(Continued)

(56) References Cited

U.S. PATENT DOCUMENTS

| | | | |
|---|---|---|---|
| 9,288,836 | B1 | 3/2016 | Clement et al. |
| 2018/0343986 | A1 | 12/2018 | Lukens et al. |

(Continued)

FOREIGN PATENT DOCUMENTS

| | | | |
|---|---|---|---|
| EP | 3101508 | A1 | 7/2016 |
| EP | 3435479 | A1 | 1/2019 |

(Continued)

OTHER PUBLICATIONS

Speidel Twist-O-Flex Apple Watch band review, by Smythe Richbourg, The Gadgeteer (2020) retrieved from the Internet (https://the-gadgeteer.com/2020/03/02/speidel-twist-o-flex-apple-watch-band-review/ on Jun. 2, 2023, 7 pages).

(Continued)

*Primary Examiner* — Ajibola A Akinyemi
(74) *Attorney, Agent, or Firm* — Merchant & Gould P.C.

(57) ABSTRACT

This application relates to a watch strap comprising a body having a first end, and a second end. The first end comprises a first watch case attachment, the second end comprises a second watch case attachment. In use, the first watch case attachment and second watch case attachment are configured for operation by a user to attach the watch strap to a watch case about a wrist of the user and then subsequently for operation, by the user, to detach the watch strap from the watch case allowing the strap to be removed from the user's wrist. A watch case and kit of parts are also disclosed.

16 Claims, 3 Drawing Sheets

(58) Field of Classification Search
CPC ... A44C 15/0025; A44C 25/007; A44C 5/142; A44C 5/185; A44C 5/2085; A44C 25/00; A44C 5/00; A44C 5/0015; A44C 5/0023
USPC ........................................................... 455/39
See application file for complete search history.

(56) References Cited

U.S. PATENT DOCUMENTS

| | | | | |
|---|---|---|---|---|
| 2019/0341677 | A1 | 11/2019 | Hsu et al. | |
| 2020/0323315 | A1 | 10/2020 | Lui et al. | |
| 2021/0036728 | A1* | 2/2021 | Dinan | H04B 1/385 |
| 2022/0206442 | A1* | 6/2022 | Barnes | A44C 5/0015 |

FOREIGN PATENT DOCUMENTS

| | | | |
|---|---|---|---|
| EP | 3772045 | A1 | 2/2021 |
| EP | 3788905 | A1 | 3/2021 |

OTHER PUBLICATIONS

Combined Search and Examination Report for Great Britain Application No. 2201604.2 dated Jul. 14, 2022, 9 pages.

* cited by examiner

COMBINATION WATCH AND MULTI-CAR KEY

RELATED APPLICATION

The present application claims priority to Great Britain Application No. 2201604.2 filed Feb. 8, 2022, which is hereby incorporated herein in its entirety by reference.

TECHNICAL FIELD

The invention relates to a watch case and watch strap.

BACKGROUND

As smart wearable devices become increasingly popular there has arisen a problem of the requirement for multiple wearable devices, each having their own function. This can be problematic as it is impractical to wear more than a certain number of wearable devices, particularly upon a user's wrist as this can hinder use of the hands as well as the excess weight.

It is desirable to be able to open and operate multiple vehicles using one key device. Common vehicle security systems have implementation differences, and a single device cannot easily work for all vehicles. The problem is further exacerbated as differing antenna designs and hardware used by car manufactures also mean that the above issues cannot be overcome by a software solution implemented on common hardware. There are multiple communication frequencies used for the high frequency Remote Keyless System (RKS). Thus, in order to be universal, a device would need radio equipment and antennas for all of these frequencies. The available public communication bands have been agreed over many years by hundreds of nations around the world, and attempting to harmonize these frequencies would be a significant undertaking, thus multiple frequencies are likely to be needed for the foreseeable future. Frequencies are not singular per region, either, so it is not possible to create devices per region, without having a multifrequency arrangement. Furthermore, there are Remote Keyless Ignition Systems (RKI), such as Keyless Go access antennas need to be matched to suit the recipient vehicle. There are multiple variants that would be required to create a universal solution. These adjustments are physical and cannot be implemented by software alone. Each tuned radio circuit is small, but if a circuit for every variant was required, the resultant device would be enormous and not practical to wear. Attempting to create a single device to cater for all current vehicle security has many physical size challenges, and ready interference challenges. These cannot be overcome in a smart phone or smart watch without consolidation of vehicle security implementations.

While there have been previous attempts at combining multiple wearable devices together, in order to provide the same function without cluttering a user's wrist, there are inherent incompatibilities and problems in doing so.

Juxtaposed with smart-tech and wearables, in certain market segments, there is the desire for analogue, mechanical technology. Such as in the field of chromography where it is desirable to have a fully mechanical watch which derives its power from the energy stored in a spring and regulates the passage of time through mechanical balancing such as using a balance spring and a balance wheel. Such devices can only be made so small and therefore miniaturization is limited by physical scales of the pieces needed to form the timepiece.

The combination of such mechanical timepieces with multiple items of smart wear is therefore problematic. This is further compounded by the risk of such timepieces interfering with wireless electronic signals emanating and being received by the electronic devices within a smart wearable item.

SUMMARY OF THE INVENTION

Aspects and embodiments of the invention provide a wearable device according to the appended claims.

In accordance with the present invention there is provided a watch strap comprising a body having a first end, and a second end, the first end comprising a first watch case attachment, the second end comprising a second watch case attachment wherein, in use, the first watch case attachment and second watch case attachment are configured for operation by a user to attach the watch strap to a watch case about a wrist of the user and then subsequently for operation, by the user, to detach the watch strap from the watch case allowing the strap to be removed from the user's wrist. Consequently only a single part strap fastened to the watch casing is required to secure the watch casing to a user's wrist. Here single part strap means a strap made as a single part as apposed to multi-part straps which require a connection or latch (such as a buckle or similar) at a point along the strap in between the ends which are connected to the watch casing. As a consequence of eliminating the connection point used in multi-part straps, the present single part strap requires means to allow a user to secure and remove a watch with the present strap to their wrist. This may advantageously be provided by configuring the first and second watch case attachments for operation by said user. That said, a multi-part strap may also be used in alternative embodiments, in such an embodiment two strap parts could be connected at a point intermediate the ends connected to the watch casing using known watch-strap connections such as a buckle, snap fit, or similar.

Advantageously the first watch case attachment has a gender different to the second watch case attachment; or the first watch case attachment has a gender which is the same as the second watch case attachment; or in the further alternative one or both of the first watch case attachment and the second watch case attachment are genderless. The use of gendered attachments facilitates control of how the single strap may be attached to the watch casing, e.g. by using gendered attachments the orientation of the strap when fitted to the watch casing may be dictated, if for example, the watch casing comprises one male fitting and one female fitting, corresponding male and female fittings would need to be provided on the strap, such that the strap could only be coupled to the watch strap when male to female couplings are aligned. It will be apparent that not all the strap connectors need to be gendered, may be of the same gender, or be different gendered provided that the combination used may allow both ends of the strap to be attached to corresponding connectors on the watch casing in order to allow the strap to fulfil its function, that is to allow a user to releasably attach the watch using the strap to their wrist. Here gendered means that the attachments designed such that one attachment of a first gender may only fit in an attachment of an opposite gender. Genderless means the attachments may be compatible with attachments of either gender or also other genderless attachments.

Suitably the strap is connectable to a watch case in a single orientation. This may be to ensure the strap and watch casing is always presented on a user's wrist in the same orientation and prevent a user fitting the strap upside-down or back-to-front to the watch casing. Likewise, such an arrangement may be advantageous if the user is visually impaired and may help them to correctly locate the watch and strap in the correct orientation for that user.

Alternatively, the strap is connectable to a watch case in multiple orientations. The strap may be symmetrical about its length and width such that arrangement of the strap in one orientation is indistinguishable from another orientation, such that it does not matter which way round the strap is fitted, therefore there is no need to dictate in which orientation the strap is connected to the watch case. Such an arrangement may also be useful if the strap is provided with aesthetic differences on either side (e.g. the strap is “double sided”) allowing a user to fit the strap in a desired orientation and expose the face having the user’s chosen design.

Preferably the strap body comprises at least one cavity having a coin cell located therein; and a first electronic communication device located therein, wherein the coin cell and at least one electronic communication device are connected, and wherein the first electronic communication device comprises a transmitter arranged to communicate with a first remote security system of a vehicle. As such the strap is configured to communicate, and interact with, the security system of a vehicle, for example, to fulfil a criteria of the security system to allow access and/or use of the vehicle to be permitted when the watch strap is presented to the vehicle security system. By locating the electronic communication device wholly within the strap no interference or rearrangement of the contents of the watch casing is required, likewise interference of the operation of the electronic communication device by the contents of the watch casing is also avoided.

Suitably the strap further comprises a second electronic communication device arranged to communicate with a second remote security system of the vehicle, optionally wherein the second electronic communication device is connected to said cell by a flexible circuit board. Accordingly, the strap may interact with the security system of a vehicle in two ways, for example providing a token, when presented to the security system that fulfils a condition allowing both disarmament of a theft alarm and disengagement of a vehicle immobilizer system, for example.

Optionally, the second communication device comprises a circuit for communicating with a keyless go system of the vehicle allowing the user of the vehicle to place the vehicle in a condition for operation, such as turning on an electric vehicle, or to progress through the ignition sequence of a vehicle with an internal combustion engine.

Preferably, the second communication device is operable to confirm that the wearable device is inside the vehicle such that the condition of the vehicle security system is only fulfilled by the electronic communication device contained within the strap only when the user is present inside the vehicle. For example, so the car may only be started once the user is in the vehicle and not, for example, adjacent to or nearby to the vehicle.

Optionally the first communication device is arranged to communicate with a keyless entry system for unlocking the doors of the vehicle such that a user approaching a vehicle wear a watch comprising the strap of the present application is able to access the vehicle by merely arranging the strap in a vicinity adjacent to the vehicle.

Suitably a button for activating said first communication device or the second communication device. A positive input may be advantageous for some users who wish to ensure a condition of a security system is only fulfilled on a positive action on the user’s part. This is in order to prevent inadvertent operation of the security system by a user, for example, merely walking past a vehicle to another destination away from the vehicle temporarily disarming the security system as they pass the vehicle.

Suitable the strap is at least partially formed of rubber, or a similar radio transparent, resilient, and durable material that allows the strap to effectively function as a strap (hold a watch casing upon a user’s wrist), hold a decorative design if required, and to allow effective operation of the electronic communication device if present within the strap.

Advantageously the strap comprises an indicator and optionally wherein the indicator emits visible light. The indicator may indicate any of: functionality status remaining cell charge, or to indicate that the vehicle is within a predetermined range of the wearable device. Therefore, a user may readily ascertain from the indicator a working state of the strap without resorting to a third party device. Such an indicator will provide confidence to a user of the correct functioning of the strap.

Preferably the watch strap is waterproof. The strap may conform to a suitable ingress protection standard and allow the wearer to use the strap in environmentally harsh conditions without adversely affecting the operation and correct functioning of the strap to either attach a watch to a wrist, or, where present, allow the effective communication of the electronic communication device present within the strap.

Suitably a length of the strap is adjustable in order to accommodate a plurality of wrist circumferences and optionally wherein, the length is set prior to attaching the strap to the watch case or the length is set during attachment of the strap to the watch case. The strap need not be made to a bespoke length to accommodate a specific user’s wrist, rather strap may allow adjustment of its length to accommodate the wrist circumferences of a distribution of users. The length is preferably adjustable by a user to accommodate their wrist, and the length may be adjusted on-the-fly from time to time to accommodate changes in wrist circumference, either by the same user, or if the strap is loaned or sold to a new user. Alternatively, the length adjustment may be “one-way” such that once the length is set for a particular user it would be difficult or impossible for a new user to alter the length of the strap to accommodate their wrist. The length may be set prior to attaching the strap to the watch casing, such that the strap is set to the required length once and need not be reset on attachment or the strap length may be adjusted on fitting to the watch casing by, for example, a mechanism to take-up and stow slack strap length.

In a further aspect there is provided a watch case comprising a first strap attachment and a second strap attachment, the strap attachments being complementary to the first watch case attachment and the second watch case attachment of the strap described above. Accordingly, the strap when combined with the watch case may be attached to one another to from a complete watch about the wrist of a user. Here watch case is taken as the housing for a timepiece, analogue or otherwise. In an alternative embodiment the watch case may be decorative in function only and unable to accommodate a timepiece. In this embodiment the watch casing and strap form a bracelet or other similar jewellery.

In a further aspect there is provided a kit of parts for forming a wearable device comprising a watch case as hereinbefore described, and a plurality of watch straps, wherein the watch straps are as also hereinbefore described. A user may readily “swap out” the strap of the watch for another strap either to, for example, replace a worn or damaged strap, change the design of strap to another chosen design or material, or to change from a strap having one electronic communication device for a given vehicle to a strap having another electronic communication device for a further, different vehicle, or a strap with no electronic communication device at all. In this way a single watch may be used to fulfil tokens of security systems of a plurality of different vehicles, by selecting the strap with the appropriate electronic communication device for that vehicle's security system. Likewise if a user does not anticipate or require interaction with a security system they may select a watch strap with no electronic communication device present.

BRIEF DESCRIPTION OF THE DRAWINGS

One or more embodiments of the invention will now be described by way of example only, with reference to the accompanying drawings, in which.

DETAILED DESCRIPTION

Figure 1:
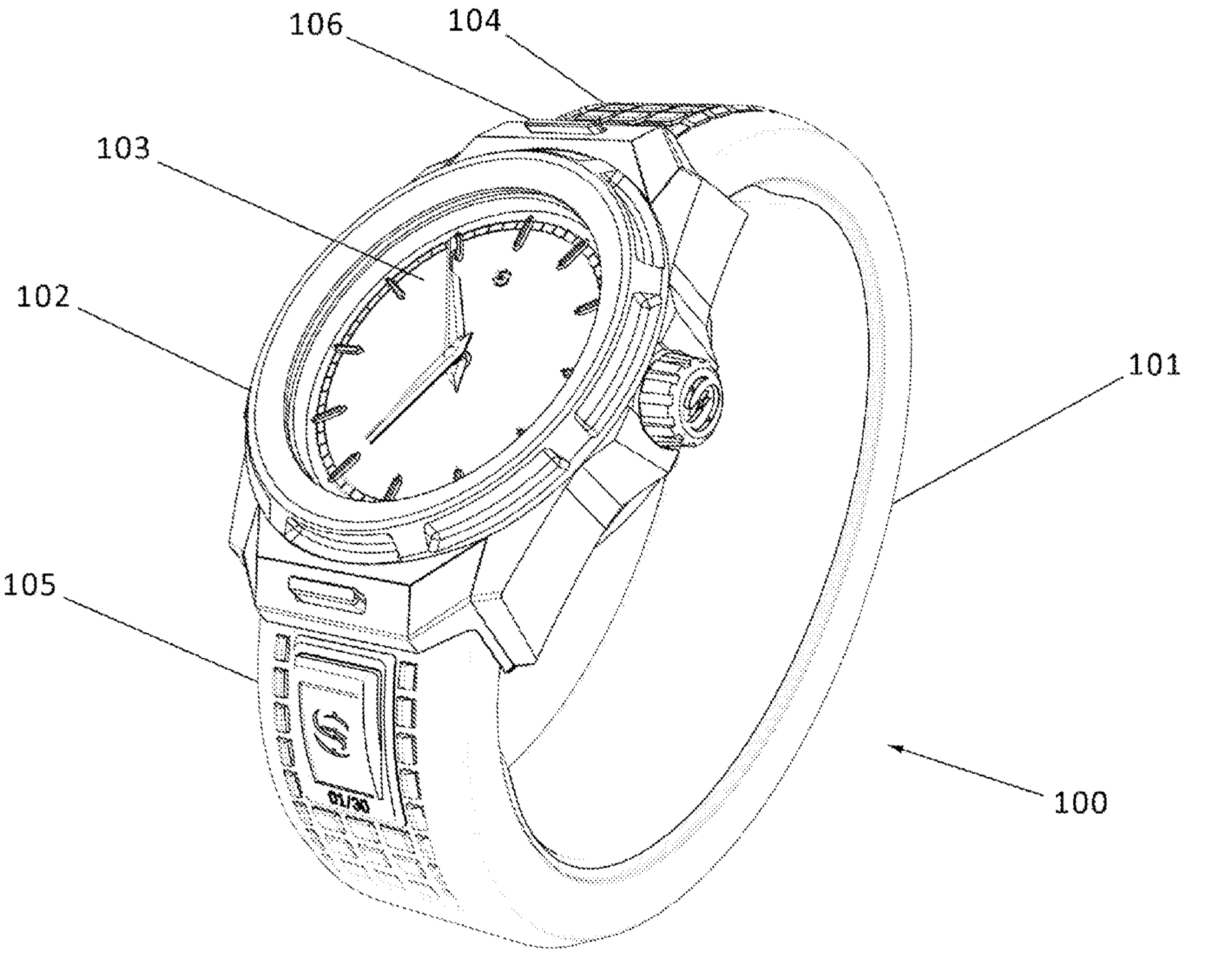
FIG. 1 shows a perspective view of a strap attached to a watch case.

Cars are road vehicles having at least one motor. Cars typically have a restricted access and/or restricted operation system i.e. a lock preventing access to the car interior and/or an immobilizer system which prevents operation of the car. These are non-limiting examples of a restricted access system and a restricted operation system respectively. Other examples are imagined. While the word "car" is used herein, the invention is suitable for use with anything that comprises a restricted access and/or restricted operation system, such as but not limited to, buildings, rooms, safes, machinery, road going vehicles including cars, agricultural vehicles, goods transport vehicles, non-road vehicles including boats, ships, trains, flying vehicles (planes, helicopters), hover craft, and so on. The term "car" is used herein for convenience and must not be construed as limiting to only "cars".

Analogue watches or timepieces employ a mechanical movement, in which the watch is powered by stored energy in a spring, that is discharged at a known rate through a complex clockwork arrangement, so as to turn the watch hands at a constant rate and display the correct time. The rate is typically derived by a mechanical mechanism such as a balance wheel and springs and not a quartz crystal or the like. These mechanical timepieces are generally powered by hand winding or by automatically harnessing mechanical energy as the user's wrist moves.

According to the present invention there is provided a strap comprising a cavity having an electronic communication device located therein. Such a strap may be connected to a mechanical timepiece as described above. This arrangement allows a mechanical watch movement to be used with the potentially bulky components necessary for communication with remote security systems of a car without the two interfering. The mechanical timepiece is adjacent, but remote from the electronic communication system of the strap thereby avoiding any precious metals in the watch interfering with radio waves. The strap may be formed from a radio transparent material allowing for transmission of radio waves and communication with the car. Precious metals may be highly radio-opaque, so locating the transceivers away from the watch body allows communication with security systems to be maintained even in premium products that incorporate large amounts of precious metals. This frees the user to use a watch casing and/timepiece that includes the use of precious metal or precious stones.

Within the present specification, a "keyless entry" system may be considered to be any remote system that allows a user to enter their vehicle without the need for a mechanical key. Such systems may be passive, in the sense that no action is needed from the user to unlock the vehicle door apart from their presence in the vicinity of the vehicle with the wearable device about their person. Alternatively, a positive action may be required from the user to unlock the vehicle, such as a press of a button.

Within the present specification, a "keyless go" system is taken to mean any system that allows a user to start operation of a vehicle (either by starting the engine, or by putting the vehicle powertrain systems into a state in which they will respond to a user's demand to move the vehicle away from a rest position), without the need for the user to insert a mechanical key into the vehicle. Again, such systems may be passive, in the sense that no action is needed from the user to start the vehicle door apart from their presence in the vicinity of the vehicle with the wearable device about their person. Alternatively, a positive action may be required from the user to unlock the vehicle, such as a press of a button. The button to start the vehicle may be a button on the vehicle, or a button on the wearable device.

The electronic communication devices contained in the strap may comprise any of a near field communication device, a transponder, or a transceiver. The communication device may be arranged to communicate via any suitable wireless communication protocol such as Bluetooth® or ZigBee®.

The strap may comprise a button for activating said electronic communication device. The button may be arranged to lock or unlock the vehicle when the user is outside the vehicle, and/or to start the vehicle when the user is inside the vehicle. Other functions of the button are also contemplated. Different functions of the button may be available by providing different inputs via the button. Such inputs may include a long press for more than a predetermined amount of time, a short press for less than the predetermined amount of time, and repeat presses wherein the button is actuated more than once within a given time frame.

Optionally, the wearable device comprises a plurality of buttons. Each button may be associated with one or more of the non-exhaustive list of functions described above.

The strap, and/or the electronic communication device therein, may be weatherproof or constructed to conform to an ingress protection standard to protect the circuitry from ingress of moisture and dirt, whilst maintain the function of the electronic device in adverse and harsh environments.

The circuitry and components thereof (including any battery or cell) may be potted, or the formation of the strap may inherently pot the circuitry located therein in order to avoid ingress of moisture and dirt.

The remote security system may be a remote security system of a car. Alternatively, the remote security system may be a security system of a dwelling such as a house or a flat, or a security system of a safe. Accordingly, the present invention may be applicable to security systems that are not related to cars.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The wearable device combines the functionality of a conventional mechanical watch with apparatus for communicating with a remote security system. Although the present invention may have other applications, the invention will be described with particular reference to embodiments in which the security system is a remote security system of a vehicle, such as a keyless entry or a keyless go system.

With reference to FIG. 1 there is shown a watch 100 comprising a strap 101, watch casing 102 housing a timepiece 103. The strap 101 is formed in a single unbroken body having length extending from a first end 104 to a second end 105. The first and second ends both have watch case attachments for attaching or detaching the strap 100 to corresponding first and second strap attachments on the watch casing 102.

Any suitable attachment may be used provided that a user is able to manipulate the attachments to attach and detach the watch from that user's wrist. In other words a third party is not required to assist a user in attaching or detaching the watch strap from the user's wrist.

Figure 2:
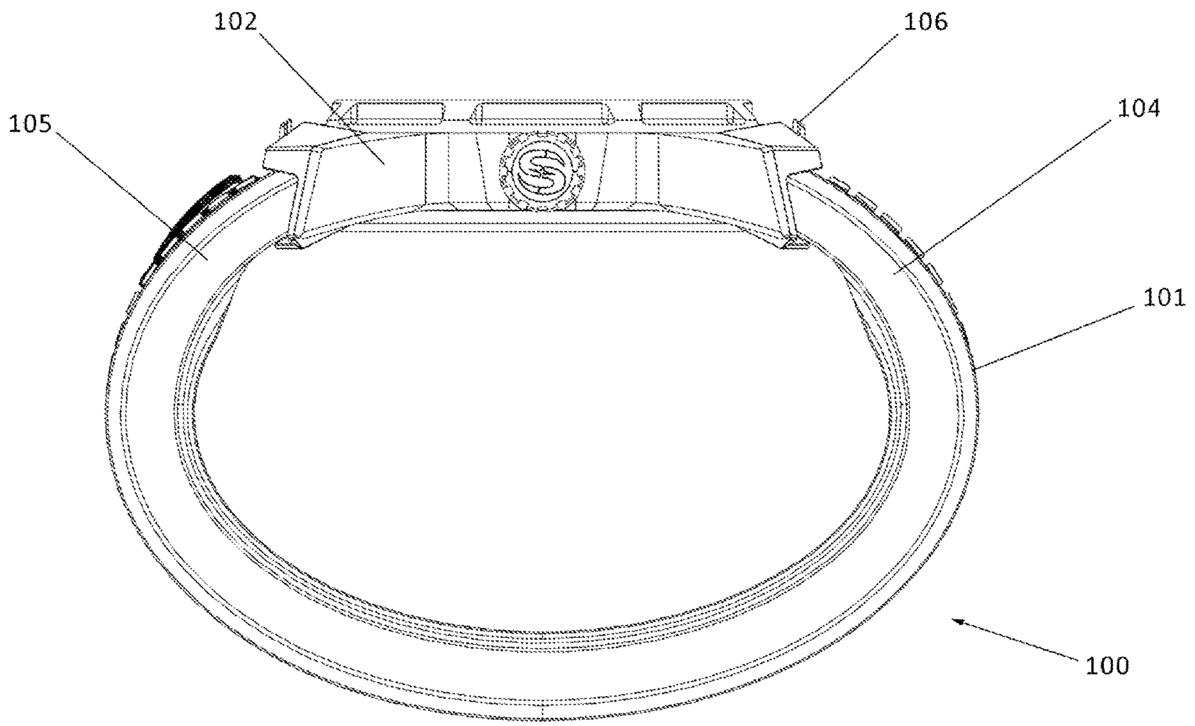
FIG. 2 shows a side view of a strap attached to a watch case.

In FIGS. 1 and 2 the attachment is operable via a stud 106 located on the watch casing. It will be apparent that studs can be provided to operate attachments at either end of the strap or another mechanism may be used in place of the stud provided that mechanism provides the same function discussed above. Like mechanisms may be used to attach either end of the strap to the watch casing or one end of the strap may be provided with a different mechanism to the other. It will also be apparent that the stud may be located on the watch casing or the strap.

Figure 3:
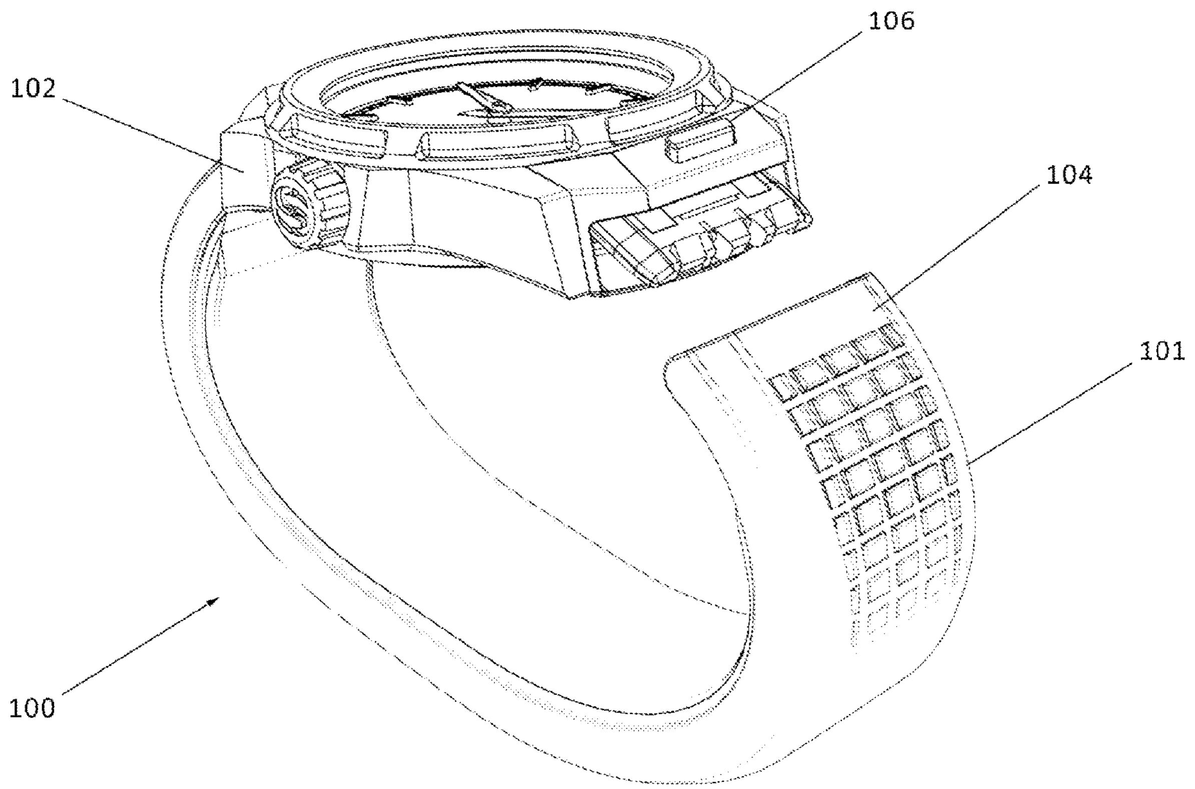
FIG. 3 shows a perspective view of a strap partially disconnected from a watch case.

FIG. 3 shows the watch 100 with an end of the strap 101 disconnected from the watch casing 102. It will be apparent that the stud may need to be depressed in order for a user to connect the strap to the casing or the mechanism may be "push fit" so a user only need urge the strap towards the casing to achieve a successful and connection between the watch strap and the watch casing.

Provided both sides of the strap are provided with a mechanism to detach the strap from the watch casing the strap may be easily detached and a further, different, strap attached to the same watch casing, provided the further strap has suitable attachments. As also discussed in this application the attachments may be suitably gendered or genderless.

By varying the attachments and using gender or genderless as appropriate the orientation of the strap to the watch casing may be controlled as the strap ends may only attach to one of the watch casing attachments or may attach in only a specific orientation. It will be apparent that the design may be changed and tailored to select attachments of the appropriate gender or genderless connectors in order to dictate the orientation of the strap attachment to the casing, or not as the case may be. Dictating that the strap may only be fitted in a single orientation may be advantageous in, for example, ensuring elements of the strap are always presented in an optimum position on a user's person. One particular example is to ensure an aerial embedded in the strap is always positioned on the outside of the user's wrist, where inside means the aerial may be sandwiched between the wrist and the body. Essentially the forced orientation for the strap places an aerial located therein adjacent the ulnar styloid of the hand such that the aerial is always between the user and a car when in use.

Likewise, the same principles may be used to allow the strap to attach in multiple orientations such the strap may be fitted "inside out", upside down, or back to front, either alone or in combination.

The strap may be provided with one or more electronic communication devices and a power source as also described elsewhere in this description allowing communication with the security system of a vehicle, or the strap may made absent electronic communication devices.

It will be apparent that due to the strap being able to detach from the watch casing a set of straps may be used by a user, with each strap having one or more electronic communication devices arranges to communicate to a respective security system of a range of cars. The user may simply select and fit the appropriate strap for the car they intend to use/access. It will be apparent that any suitable electronic communication device may be used and may be flexible or rigid also as described elsewhere in this application.

The watch movement is a conventional mechanical watch movement that controls several components including the hands of the watch face. In the illustrated embodiment, the watch movement also provides a stopwatch function and a date display function. However, it will be understood that a different type of mechanical watch movement may be provided in other embodiments.

The watch casing is made of metal such that it is hard wearing and non-brittle. In some embodiments, the metal may be a precious metal such as gold or platinum. The components of the mechanical watch movement are also made from metal. However, metals, especially precious metals, are generally radio opaque, meaning that communicating with a vehicle via radio antenna within the watch casing is not possible.

The strap is formed of a flexible material, such as rubber. However, the skilled person will understand that other flexible materials could be used in other embodiments.

The strap is provided with a cavity into which a battery housing containing a cell is inserted. The cavity is sized to substantially match the shape of the battery housing, but to be slightly smaller than the battery housing such that an interference fit exists between the walls of the cavity and the battery housing when the battery housing is inserted into the cavity. For the avoidance of doubt the cavity may be formed during the strap manufacturing process, for example by embedding the cavity contents into the strap by over molding or casting. In this instance the cavity is completely filled with the cavity contents. Alternatively the cavity may be formed from a negative manufacturing technique where material is removed from a "blank" strap via milling or carving for example.

Also within the cavity is located appropriate circuitry for communication with the security system of a car, including one or more spaced-apart transceivers. The circuitry may include a circuit board, the board may be a rigid printed circuit board or a flexible circuit board, or a mixture thereof. Each transceiver has an associated antenna. The cavity is sized such that the circuit board and mounted transceivers are held in an interference fit in the cavity.

Transmission of signals from the transceivers is permitted because the strap is formed from radio transparent materials. For example, the straps may be formed of rubber, optionally coated with leather or another radio-transparent material.

The array of transceivers are arranged to transmit radio signals which communicate with a vehicle, allowing a user to passively unlock the vehicle when the watch is within a predetermined range. This may be referred to as a keyless entry system. Keyless entry systems typically work by the vehicle intermittently transmitting signals, which are received by a transceiver of the keyless entry system. Upon receipt of the signal from the vehicle, the transceiver produces a signal comprising a code which can be received by the vehicle. If a signal indicating a "correct" code is received by the vehicle, then the doors are automatically unlocked, with no further action from the user being required.

In addition to a keyless entry functionality, the array of transceivers also provide a "keyless go" function, which allows a user to start operation of a vehicle simply by pressing a button to start the engine (or, in the case of an electric or hybrid vehicle, to put the electric machine and other powertrain components in a "ready" state in which they will respond to a user's request to commence movement of the vehicle). The button may be a button on the vehicle's dashboard, or a button on the key (which is the strap in the context of the present invention).

The keyless go system requires additional transceivers to the keyless entry system, as it is necessary for the vehicle to determine that the key is actually within the vehicle before allowing the vehicle to be driven away. This is typically achieved by one of the transceivers receiving signals which are transmitted from various positions within the vehicle, and providing a predetermined response to each of the signals. The vehicle is then operable to determine the position from which the responses originated, and the keyless go function is only activated in the event that the vehicle determines that the responses are the expected responses and that they originated from within the vehicle.

The strap is provided with a button, which button may be operable to cause a signal to be sent, which signal may cause a vehicle to start if it is sent from within the vehicle. However, it will be understood that the functionality available by pressing the button will depend on the specific vehicle that the strap is arranged to unlock and start. The button may cause a signal to be sent that operates to unlock the vehicle from a relatively large distance away, in the manner of a conventional remote key.

When the cell requires replacement, a service technician is able to remove the cell housing from the cavity in the strap, and then placing the housing in a solvent which will dissolve the resin, allowing the cell to be removed from the housing and disconnected from the flexible circuit board. The process of attaching the cell to the printed circuit board and potting the cell within the housing can then be repeated with a new cell.

The parts of the printed circuit board that are not potted with the cell, and the array of transducers are waterproofed by conformally coating them, which in addition to the cavities within the strap in which they are located prevents moisture, dirt and other contaminants from interfering with the electrical components whilst allowing the flow of electricity through the PCB and radio waves to propagate from the array. The conformal coating also maintains the required flexibility of the flexible parts of the printed circuit board.

The parts to be conformally coated are sprayed with a waterproof resin. However, conformal coating may be added by many methods and most would be appropriate for the present purposes.

The strap are connected to the watch housing by a releasable attachment mechanism.

The strap may be provided with an indicator, that may emit visible light to be seen by a user, such as by LED. The indicator may be capable of lighting up in various colours, blinking, or varying in brightness to display various information. Some examples of different information which the indicator may display include blinking red to indicate that the cell needs to be replaced, showing solid green to indicate that the vehicle is within communication range, blinking green to remind a user that the vehicle is unlocked, blinking orange if detectors in the vehicle discover the interior temperature is above a certain threshold or blue if an anti-theft alarm is activated on the vehicle.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A single part watch strap comprising:

a body having a first end, and a second end, the first end comprising a first watch case attachment, the second end comprising a second watch case attachment wherein, in use, the first watch case attachment and the second watch case attachment are configured for operation by a user to attach the watch strap to a watch case about a wrist of the user and then subsequently for operation, by the user, to detach the watch strap from the watch case allowing the strap to be removed from the user's wrist, wherein the body comprises a single cavity having:

a coin cell located therein; and a first electronic communication device located therein;

wherein the coin cell and the first electronic communication device are connected, and wherein the first electronic communication device comprises a transmitter arranged to communicate with a first remote security system of a vehicle.

2. The watch strap of claim 1 wherein the first watch case attachment has a gender different to the second watch case attachment; or wherein the first watch case attachment has a gender which is the same as the second watch case attachment; or wherein one or both of the first watch case attachment and the second watch case attachment are genderless.

3. The watch strap of claim 1, wherein the strap is connectable to a watch case in a single orientation.

4. The watch strap of claim 1, wherein the strap is connectable to a watch case in multiple orientations.

5. The watch strap of claim 1, wherein the at least one electronic communication device is wholly located within the strap.

6. The watch strap of claim 1, wherein the strap further comprises a second electronic communication device arranged to communicate with a second remote security system of the vehicle, and wherein the second electronic communication device is connected to said coin cell by a flexible circuit board.

7. The watch strap as claimed in claim 6, wherein the second communication device comprises a circuit for communicating with a system of the vehicle that allows a user to start a vehicle without the need for the user to insert a mechanical key into the vehicle.

8. The watch strap of claim 6, wherein the second communication device is operable to confirm that the wearable device is inside the vehicle.

9. The watch strap of claim 1, wherein the first communication device is arranged to communicate with a keyless entry system for unlocking the doors of the vehicle.

10. The watch strap of claim 1, further comprising a button for activating said first communication device.

11. The watch strap of claim 1, wherein the strap is at least partially formed of rubber.

12. The watch strap of claim 1, wherein the strap comprises an indicator and wherein the indicator emits visible light.

13. The watch strap of claim 12, wherein the indicator indicates any of: functionality status, remaining coin cell charge, or that the vehicle is within a predetermined range of the wearable device.

14. The watch strap of claim 1, wherein the watch strap is waterproof.

15. The wearable device comprising;

a watch case; and the watch strap of claim 1;

wherein the watch case comprises a first strap attachment and a second strap attachment, the strap attachments being complementary to the first watch case attachment and the second watch case attachment of the strap.

16. A kit of parts for forming a wearable device comprising:

a watch case, and a plurality of watch straps, wherein the watch straps are as claimed in claim 1.

* * * * *